United States Patent [19]

Townend

[11] Patent Number: 4,987,907

[45] Date of Patent: Jan. 29, 1991

[54] CHEWING TOBACCO COMPOSITION AND PROCESS FOR PRODUCING SAME

[75] Inventor: John Townend, Lancaster, Pa.

[73] Assignee: Helme Tobacco Company, Helmetta, N.J.

[21] Appl. No.: 212,877

[22] Filed: Jun. 29, 1988

[51] Int. Cl.$^5$ ...................... A24B 15/28; A24B 15/30
[52] U.S. Cl. .................................. 131/352; 131/359; 131/369; 131/309; 131/310
[58] Field of Search ............... 131/352, 369, 359, 309, 131/310

[56] References Cited

U.S. PATENT DOCUMENTS

| | | | |
|---|---|---|---|
| 2,371,389 | 3/1945 | Goepp | 131/352 |
| 2,809,904 | 10/1957 | Kovee | 131/359 |
| 3,872,870 | 3/1975 | Buchmann et al. | 131/369 |

*Primary Examiner*—V. Millin
*Attorney, Agent, or Firm*—Lucas & Just

[57] ABSTRACT

The chewing tobacco composition contains 25 to 40% by weight cut tobacco, 0.1 to 10% by weight powdered cellulose pulp and 60 to 75% by weight casing solids. The use of powdered cellulose pulp in the composition provides for an increase in the amount of casing solids in the composition. The method entails dipping the cut tobacco into a casing solution composition containing 40% by weight water and 0.5 to 4.0% by weight powdered cellulose pulp.

16 Claims, No Drawings

CHEWING TOBACCO COMPOSITION AND PROCESS FOR PRODUCING SAME

The present invention relates to chewing tobacco and more particularly to a sweet chewing tobacco composition that contains powdered cellulose pulp.

Chewing tobacco is a category of smokeless tobacco and is generally sold in one of three forms: a plug where the tobacco is compressed into any one of a number of shapes; twists where the leaves are intertwined into a shaped product; and loose where the tobacco is neither pressed nor shaped but presented to the consumer loose in a pouch. Plugs typically come in two forms, soft plugs and hard plugs. Sweet chewing tobaccos are a category of chewing tobaccos that are perceived by the consumer to be very sweet.

Generally, chewing tobacco is made by cutting tobacco into strips of suitable size; dipping the tobacco into a casing solution; partially drying the cased tobacco; holding the tobacco in a container for a bulking period; and finally packaging it. The tobacco used in chewing tobacco is typically fermented and aged prior to the cutting step. Most manufacturers remove the stem either prior to or during the cutting step and may or may not add back the crushed stem later on as a filler to the chewing tobacco.

Casing solutions generally comprise water and casing solids which are made up of flavorings, sweeteners, salts, preservatives and syrups. The non-tobacco portion of the chewing tobacco composition, the casing solids, contributes substantially to the product's taste and consistency. Sweet chewing tobaccos are extremely sweet and, because carbohydrate sweeteners such as sucrose and high fructose corn syrups cannot be incorporated into the chewing tobacco composition in sufficient quantity to give the desired sweetness, intensely sweet artificial sweeteners are added. One such artificial sweetener is saccharin.

A problem associated with saccharin is the unpleasant bitter aftertaste that it produces. When saccharin is used at low levels to minimize its bitterness, it becomes the minor contributor to total sweetness. To compensate for this, a much greater amount of carbohydrate sweeteners would have to be added to the tobacco to maintain the original sweetness. However, adding more carbohydrate sweeteners to the tobacco to reduce the amount of artificial sweeteners is not possible because in practice it has been found that the limit of casing and moisture that can be absorbed by the tobacco is about the presently used 68% by weight (42% casing solids by weight) of the chewing tobacco product.

If additional casing solids are adhered to the surface of the tobacco to increase the amount of carbohydrate sweeteners in the chewing tobacco composition, the exterior of the chewing tobacco becomes sticky and difficult for the user to handle. Additionally, during manufacture such a high amount of surface casing fouls processing equipment and makes packaging difficult or virtually impossible.

Applicant has now discovered how to increase the amount of carbohydrate sweeteners without having these disadvantages. Specifically, applicant has discovered a new chewing tobacco composition that comprises tobacco, casing solids and powdered cellulose pulp. The powdered cellulose pulp absorbs casing solids and allows for an increase in the amount of casing solids in the tobacco composition. Such an increase of the casing solids, including the content of carbohydrate sweeteners, allows for a decrease of the amount of artificial sweeteners without the loss of the desired perceived sweetness of the chewing tobacco product. Such an increase in the amount of casing solids in the tobacco composition of the present invention also allows the manufacturers a greater latitude in designing a product with maximum consumer attributes. The product of the present invention has excellent organoleptic properties, an excellent dark appearance and packs well in the mouth. In addition, it retains its softness even when exposed to the atmosphere.

Powdered cellulose pulp as used in the specification and claims means purified, mechanically disintegrated cellulose prepared by processing bleached cellulose obtained as a pulp from such fibrous materials as wood or cotton. It occurs as a white, odorless substance and consists of fibrous particles. It is available in various grades, exhibiting degrees of fineness ranging from a dense, free-flowing powder to a coarse, fluffy, nonflowing material. It is insoluble in water, in dilute acids, and in nearly all 10 organic solvents. Good results have been obtained by using food grade cellulose sold under the trademark SOLKA-FLOC BW-20 manufactured by James River Corporation.

By using the chewing tobacco composition of the present invention, it has been found that the amount of casing solids in the chewing tobacco composition can be increased by about four times the weight of the added cellulose.

In accordance with the present invention, the amount of powdered cellulose used in the chewing tobacco composition of the present invention is about 0.1% by dry weight to about 10% by dry weight of chewing tobacco composition. More preferred is to use about 0.5% by dry weight to about 6% by dry weight and good results have been obtained by using about 1.2% to about 4% by dry weight.

In a conventional sweet chewing tobacco composition tobacco comprises between about 41-44% and casing solids about 56-59% of the dry weight.

The amount of cut tobacco in the chewing tobacco composition of the present invention is about 25% to about 40% by dry weight of the chewing tobacco composition.

The amount of casing solids in the chewing tobacco composition of the present invention is about 60% to about 75% of the dry weight. More preferably, about 62% to about 70% of the dry weight is included in the chewing tobacco composition of the present invention. Good results have been found with 68% by dry weight.

In order to make the chewing tobacco composition of the present invention, cut tobacco, powdered cellulose pulp and casing solution are mixed, the mixture is partially dried and then subjected to bulking and packaging. The step of mixing the cut tobacco, powdered cellulose pulp and casing solution is accomplished by dry mixing the powdered cellulose pulp with the cut tobacco and then dipping this mixture into a casing solution, or dipping the cut tobacco into a casing solution containing the powdered cellulose pulp or a combination of these two procedures. Preferably, the cut tobacco is dipped in a casing solution containing powdered cellulose pulp. The step of dipping is accomplished in a conventional manner by immersing the cut tobacco or the dry mix of cut tobacco and powdered cellulose pulp into a trough containing the casing solution or the mix of casing solution and powdered cellulose pulp and then squeezing the resulting mixture of cut tobacco, powdered cellulose pulp and casing solution to remove excess casing solution The excess casing solution squeezed from the mixture is preferably returned to the trough.

A preferred method for preparing the chewing tobacco composition in accordance with the present invention comprises threshing the tobacco to a suitable size, dipping the tobacco in a casing solution that contains powdered cellulose pulp, partially drying the cased tobacco, bulking it for a period and finally packaging it.

The type of tobacco used in chewing tobacco is typically air cured which is subsequently fermented and aged. The tobacco used in the present invention is a blend of air cured tobaccos.

The threshing step was accomplished in a conventional manner. A threshing machine was used which not only cut the tobacco leaves but also removed stems from the leaves. A portion of the stems was rolled or flattened in a conventional manner and added back to the cut tobacco in a subsequent step prior to casing.

The threshed tobacco was then moved by conveyor belt to the dipping step.

The preferred casing solution was prepared by adding casing components including powdered cellulose pulp to hot water. The casing solution is held in a tank maintained at a temperature between about 60° C to about 95° C, preferably about 75° C, under agitation. The concentration of the casing solution was in the range of about 58% to about 67% solids and more preferably about 60% solids. The tank is used to fill the dipping trough as needed.

The tobacco was dipped with the casing solution in a conventional manner by passing it through a trough in which it was immersed in the casing solution and picked up by a paddle wheel onto a conveyor where excess casing was squeezed from the tobacco with the excess casing being returned to the trough.

Typically, the tobacco prior to entering the casing trough has a moisture content of about 25% by weight. The dipped tobacco has a composition of about 37% moisture by weight and about 41% to about 44% casing solids by dry weight. Typically, the residence time of the tobacco in the trough is less than about one minute. The step of partially drying the cased tobacco is accomplished in a conventional manner, such as by hot air drying.

The partially dried tobacco is bulked and subjected to packing in a known manner.

If powdered cellulose is included with the cut tobacco, it is dry blended in a conventional manner.

Subsequently, the dry mix of cut tobacco and powdered cellulose pulp is subjected to a conventional dipping operation by passing it through a trough in which it is immersed in a casing solution and picked up by a paddle wheel onto a conveyor where excess casing is squeezed from the cased mixture The excess casing solution is returned to the trough.

The cased mixture is then dried, bulked and packed as described above.

A casing solution is an aqueous solution of flavorings, sweeteners, preservatives, salt and syrup. More specifically, the casing solution includes corn syrups, sugars such as sucrose, molasses, salt, humectants such as glycerine licorice and generally one or more preservatives such as sodium benzoate and the like.

In the preferred application of the invention, the casing solution comprises about 40% water and about 60% of a casing solids composition that consisted of powdered cellulose pulp, flavorings, sweeteners, salt, preservatives and syrups. The range of water was about 33% to about 42% by weight and the range of casing solids composition was about 58% to about 67% by dry weight. The chewing tobacco composition of the present invention was made by including in the casing solution powdered cellulose pulp in an amount of about 0.5% to about 4% by weight based on the weight of the casing solution More preferably about 2% to about 3.8% by weight powdered cellulose pulp was included and good results were obtained with the inclusion of about 3.6% by weight powdered cellulose pulp.

The pH range of the casing solution was from about 2 to about 10. It was preferred that the pH of the casing solution be on the acid side, e.g. about 4.5 to about 7.

In order to prepare a casing solution in accordance with the present invention, water was mixed in a heated tank with powdered cellulose pulp and other ingredients. The other ingredients added to the casing solution were sweeteners, preservatives, salt and syrups; and, just prior to use, flavorings. Mixing was accomplished with a conventional stirring mechanism. Heat was conventionally supplied to the tank through heating coils. The casing solution was maintained at a temperature from about 60° C. to about 95° C.

These and other aspects of the present invention may be more fully understood with respect to the following examples.

EXAMPLE 1

This example illustrates preparing a sweet chewing tobacco composition in accordance with the present invention.

Air cured tobaccos were each subjected to bulk fermentation, aging and then subsequently steamed in an enclosed chamber at about 93° C. for 6 to 8 hours. This increased the moisture content of the tobaccos to between 25% and 27%. Next, the tobaccos were blended and subjected to a threshing machine which cut the tobacco and removed virtually all the stem. The stem was then flattened and a portion of the stem added back to the tobacco This cut tobacco was then taken by conveyor belt to a casing solution trough for treatment with a casing solution The casing solution was prepared using a formulation that comprises 40% water by weight and about 60% by weight of casing solids composition comprising flavoring, molasses, sucrose, corn syrup, salt, preservatives, and powdered cellulose pulp. The casing solution was prepared in a tank that was maintained at a temperature of 74° C. A stirring shaft was mounted with a standard propeller and operated in a conventional manner to stir the casing solution. This casing solution included 3.6% by weight of powdered cellulose pulp. The cut tobacco was fed by conveyor belt to a trough containing the casing solids where a paddle wheel type device moved the tobacco through the trough onto a second conveyor where the excess casing was squeezed out of the tobacco. The squeezed tobacco had a moisture content of about 38%. The casing solution that was squeezed out of the cased tobacco was returned to the trough.

Next, the squeezed cased tobacco was subjected to a hot air dryer which dropped the moisture down to between about 24% and 26%. This partially dried tobacco was then bulked.

The chewing tobacco composition made in accordance with this example typically had a moisture content of about 25% by weight and the following typical analysis:

TABLE I

|  | Parts by Weight |
|---|---|
| Tobacco | 100 |
| Cellulose | 11.75 |
| Other Casing Solids Components | 194 |
| Moisture | 102 |

EXAMPLE 2

This example illustrates the increased amount of casings solids of the present invention compared to conventional sweet chewing tobacco.

Table II below compares composition data of two sweet chewing tobacco products manufactured according to the present invention with that of conventional products.

TABLE II

| | Parts by Weight | | |
|---|---|---|---|
| Component | Conventional | Invention A | Invention B |
| Tobacco | 100 | 100 | 100 |
| Casing | 130 | 145 | 220 |
| Cellulose Pulp | 0 | 5 | 30 |
| Moisture | 75 | 85 | 114 |

Each of these chewing tobacco compositions were prepared in the manner described in Example 1 above except that no powdered cellulose pulp was included in the casing solution used to prepare the conventional chewing tobacco composition.

The composition of Present Invention A represents a preferred low level addition of powdered cellulose pulp. Present Invention B is a composition in which 50% of the powdered cellulose pulp used was added by dry blending with the tobacco and the other 50% contained in the casing solution.

To show that the amount of tobacco is reduced by using the present invention, the chewing tobacco compositions of Table II were measured as percent by weight and the values are given below in Table III:

TABLE III

| | Percent by Weight | | |
|---|---|---|---|
| Component | Conventional | Invention A | Invention B |
| Tobacco | 32.8 | 29.9 | 21.6 |
| Casing Solids (including cellulose) | 42.6 | 44.8 | 53.9 |
| Moisture | 24.6 | 25.3 | 24.5 |

Clearly, the present invention provides a savings in the amount of tobacco used in the product.

It will be understood that it is intended to cover all modifications and changes in the preferred embodiment of the present invention herein chosen for the purpose of illustration which do not constitute a departure from the spirit and scope of the invention.

What is claimed is:

1. A method for making a chewing tobacco composition comprising the steps of:
   preparing a casing solution composition comprising a casing solution and powdered cellulose pulp;
   dipping cut tobacco into the casing solution composition; and
   recovering a mixture of the casing solution composition and the cut tobacco.

2. A method for making a chewing tobacco composition comprising the steps of:
   preparing a dry mix of cut tobacco and powdered cellulose pulp;
   dipping the dry mix into a casing solution; and recovering a mixture of the casing solution and the dry mix.

3. The method of claim 2 wherein the casing solution comprises water, sweeteners, flavorings preservatives and syrup.

4. The method of claim 2 wherein the step of recovering the mixture comprises the successive steps of partially drying the mixture, bulking the partially dried mixture and finally packaging the bulked, partially dried mixture.

5. The method of claim 2 wherein the casing solution is maintained at a temperature from about 60° C. to about 95° C. during the dipping step.

6. The method of claim 2 wherein the casing solution has a pH between 4.5 to 7.

7. The method of claim 1 wherein the dipping step comprises immersing the cut tobacco in the casing composition, squeezing the cased cut tobacco to remove excess casing solution and returning the excess casing solution to the casing composition.

8. The method of claim 1 wherein the casing solution further comprises water, sweeteners, flavorings, preservatives and syrup.

9. The method of claim 1 wherein the powdered cellulose pulp in the casing solution composition is about 0.5 to 4.0% by weight.

10. The method of claim 1 wherein the powdered cellulose pulp in the casing solution composition is about 2 to 3.8% by weight.

11. The method of claim 1 wherein the powdered cellulose pulp in the casing solution composition is about 3.6% by weight.

12. The method of claim 1 wherein the step of recovering the mixture comprises the successive steps of partially drying the mixture, bulking the partially dried mixture and finally packaging the bulked, partially dried mixture.

13. The method of claim 1 wherein the casing solution composition is maintained at a temperature from about 60° C. to about 95° C. during the dipping step.

14. The method of claim 1 wherein the casing solution composition has a pH of about 4.5 to 7.

15. The method of claim 1 wherein the casing solution contains about 40% water.

16. The method of claim 1 wherein the casing solids composition had solids level of about 60%.

* * * * *